US006098394A

United States Patent [19]

Hashimoto et al.

[11] Patent Number: 6,098,394

[45] Date of Patent: Aug. 8, 2000

[54] BAND-LIKE ACCESSORY

[75] Inventors: Norio Hashimoto, Tanashi; Kazumasa Yasui, Tokyo, both of Japan

[73] Assignee: Citizen Electronics Co., Ltd., Fujiyoshida, Japan

[21] Appl. No.: 09/381,623

[22] PCT Filed: Jan. 29, 1999

[86] PCT No.: PCT/JP99/00401

§ 371 Date: Dec. 9, 1999

§ 102(e) Date: Dec. 9, 1999

[87] PCT Pub. No.: WO99/38410

PCT Pub. Date: Aug. 5, 1999

[30] Foreign Application Priority Data

Jan. 29, 1998 [JP] Japan .................................. 10-030368

[51] Int. Cl.[7] ..................................................... F16G 15/04

[52] U.S. Cl. ......................................... 59/82; 59/80; 59/85

[58] Field of Search ................................... 59/80, 82, 84, 59/85; 63/4, 7

[56] References Cited

U.S. PATENT DOCUMENTS

| | | | |
|---|---|---|---|
| 2,661,228 | 12/1953 | Wilson | 59/82 |
| 3,837,163 | 9/1974 | Fujimori | 59/80 |
| 4,269,026 | 5/1981 | Bulle et al. | 59/82 |
| 5,197,274 | 3/1993 | Braun | 59/80 |

FOREIGN PATENT DOCUMENTS

| | | |
|---|---|---|
| 4318864 | 9/1941 | Japan . |
| 5745312 | 8/1980 | Japan . |
| 5-74309 | 3/1992 | Japan . |

*Primary Examiner*—David Jones

*Attorney, Agent, or Firm*—Dennison, Scheiner, Schultz & Wakeman

[57] ABSTRACT

In a personal adornment band comprising a plurality of links (2) each having a pair of legs (4*a*, 4*b*), a recess (5) formed between the legs, and a projection (6) formed on the other side of the recess, the projection of each link being inserted in the recess of the adjacent link, and a connecting pin (3) being inserted into holes formed in the connecting legs and the projection of the links for connecting the links, each of the links (2) has a pin locking cylinder (7) fixed in one of the holes thereof, the connecting pin (3) has a manipulating portion (14*a*) slidable in the axial direction thereof, a radially projecting engaging lug (17) formed on the manipulating portion, and a spring for outwardly urging the manipulating portion, the pin locking cylinder (7) having a guide surface (21) formed at the connecting pin inserting end, a guide groove (22) axially extending from the guide surface, an engaging hole (23) formed at the inner end of the guide groove in the circumferential direction, and a stopper lug (24) formed between an outer inner wall of the engaging hole and the guide groove. The manipulating portion (14*a*) is pushed by a screwdriver thereby causing the engaging lug to be inserted from the guide surface of the pin locking cylinder into the guide groove and the engaging hole, and to be engaged with the stopper lug of the engaging hole.

10 Claims, 11 Drawing Sheets

BAND-LIKE ACCESSORY

TECHNICAL FIELD

The present invention relates to a watchband, and more particularly to a structure for connecting links to a personal adornment band such as a necklace, bracelet, and the like, which forms a band.

BACKGROUND ART

There has been proposed a variety of structures for connecting links of a watchband. As a structure for adjusting a length of a band, there is generally known a structure wherein a connecting pin having a shape of a hairpin is inserted in holes of adjacent links so as to connect the links.

However, in such a connecting structure, the connecting pin is small so that a special tool is necessary to insert and pull out the pin, or the pin may be lost during the operation for adjusting the band length. Moreover, an accurate cross section shape is required for securely connecting links, and repeated use is not possible. When adjusting, there happens that one pin is difficult to pull out, while another easily falls out because of variances in dimensions of the hole and connecting pin. Hence, the operability at the adjustment of the band length is poor and a skilled operator is needed.

In order to resolve the above-described problems, there is a structure disclosed in Japanese Utility Model Application Laid Open 57-45312. In the structure, a keyway, which is a locking portion, is integrally formed inside a hole of each of the lugs formed on a case. However, it is extremely difficult to machine the keyway. In addition, the machining accuracy cannot be maintained so that mass production is difficult.

Japanese Utility Model Application Laid Open 6-74309 discloses another structure for resolving the above-described problems of the conventional structure. The structure has a stopper ring provided with a keyway thereby forming a locking member.

However, in the above-mentioned conventional band connecting structure, the keyway and a projection of a connecting pin are both very small, rendering it impossible to see them during the operation for inserting the connecting pin and engaging the projection with the keyway. Accordingly, it is difficult to position the keyway and the projection so that the operability is poor. Moreover, the structure is defective, for example, in that, in order to securely engage the connecting pin in the locking member, the connecting pin must be pushed in the axial direction while circumferentially rotating the pin, thereby rendering the operability extremely poor.

An object of the present invention is to provide a structure for connecting links of a band, wherein links or a watchcase and a link of the band can be easily connected and disengaged.

DISCLOSURE OF THE INVENTION

According to the present invention, there is provided a personal adornment band comprising a plurality of links each having a pair of legs, a recess formed between the legs, and a projection formed on the other side of the recess, the projection of each link being inserted in the recess of an adjacent link, and a connecting pin being inserted into holes formed in the connecting legs and the projection of the links for connecting the links, wherein at least each of some of the links has a pin locking cylinder fixed in one of the holes, the connecting pin has a manipulating portion slidable in the axial direction thereof, a radially projecting engaging lug formed on the manipulating portion, and a spring for outwardly urging the manipulating portion, the pin locking cylinder has a guide surface formed at the connecting pin inserting end, a guide groove axially extending from the guide surface, an engaging hole formed at the inner end of the guide groove in the circumferential direction, and a stopper lug formed between an outer inner wall of the engaging hole and the guide groove, and the manipulating portion is pushed by a screwdriver thereby causing the engaging lug to be inserted from the guide surface of the pin locking cylinder into the guide groove and the engaging hole, and to be engaged with the stopper lug of the engaging hole.

The guide groove is helical, thereby introducing the engaging lug into the engaging hole.

The guide surface has an inclination declining axially inward from one end to the other end.

The guide surface may have an inclination declining from a center portion thereof toward opposite ends.

A lug may be formed at an end of the guide surface for stopping the engaging lug.

The present invention further provides a watch comprising a plurality of links each having a pair of legs, a recess formed between the legs, and a projection formed on the other side of the recess, the projection of each link being inserted in the recess of an adjacent link, and a connecting pin being inserted into holes formed in a pair of connecting legs of a watchcase and the projection of an end link of a band, wherein the watchcase has a pin locking cylinder fixed in a hole of the connecting legs, the connecting pin has a manipulating portion slidable in the axial direction thereof, a radially projecting engaging lug formed on the manipulating portion, and a spring for outwardly urging the manipulating portion, the pin locking cylinder has a guide surface formed at the connecting pin inserting end, a guide groove axially extending from the guide surface, an engaging hole formed at the inner end of the guide groove in the circumferential direction, and a stopper lug formed between an outer inner wall of the engaging hole and the guide groove, and the manipulating portion is pushed by a screwdriver thereby causing the engaging lug to be inserted from the guide surface of the pin locking cylinder into the guide groove and the engaging hole, and to be engaged with the stopper lug of the engaging hole.

The guide groove of the pin locking cylinder of the band is helical, thereby introducing the engaging lug into the engaging hole.

The guide surface of the pin locking cylinder of the band has an inclination declining axially inward from one end to the other end.

The guide surface of the pin locking cylinder of the band may have an inclination declining from a center portion thereof toward both ends.

A lug maybe formed at an end of the guide surface of the pin locking cylinder for stopping the engaging lug.

BEST MODE FOR EMBODYING THE INVENTION

The present invention will be described hereinafter with reference to the drawings.

Figure 1:
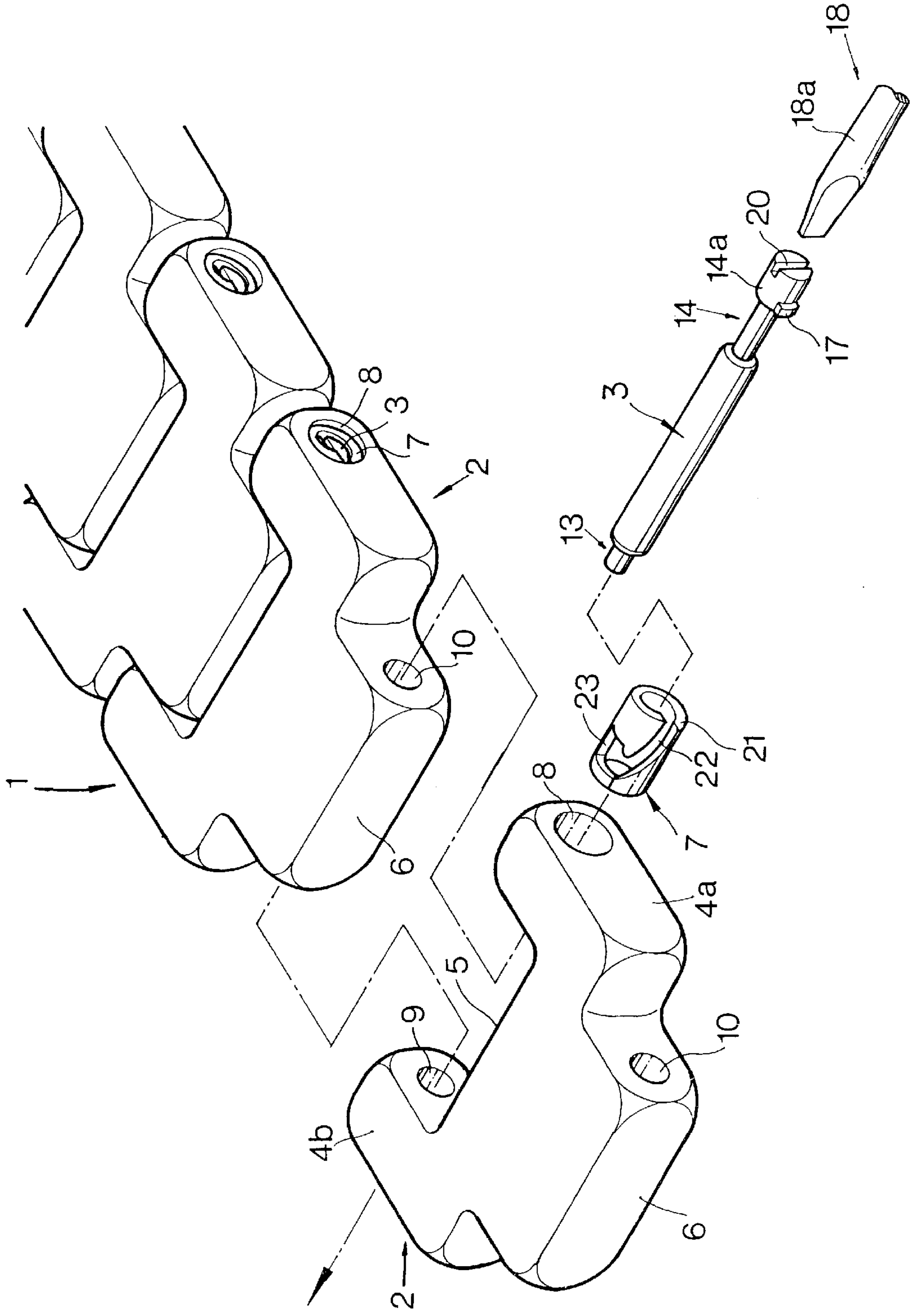
FIG. 1 is an exploded perspective view of a first embodiment of the present invention.

FIG. 1 is a perspective view showing the first embodiment wherein the present invention is adapted for a watchband.

A band 1 comprises a plurality of links 2 connected to one another by connecting pins 3. Each link 2 has, at one end thereof, a pair of connecting legs 4*a* and 4*b*, and a recess 5 formed between the legs, and at the other end, a connecting projection 6. The projection 6 is adapted to be slidably inserted in the recess 5 of the adjacent link.

In each of at least some of the links which form the band 1, a hole 8 is formed in the connecting leg 4*a* for inserting a pin locking cylinder 7, while a blind hole 9 is formed in the other connecting leg 4*b*. The projection 6 has a hole 10 so that when the recess 5 of the link 2 engages with the projection 6 of the adjacent link 2, the holes 8 and 10 and the blind hole 9 are communicated with one another.

Figure 3:
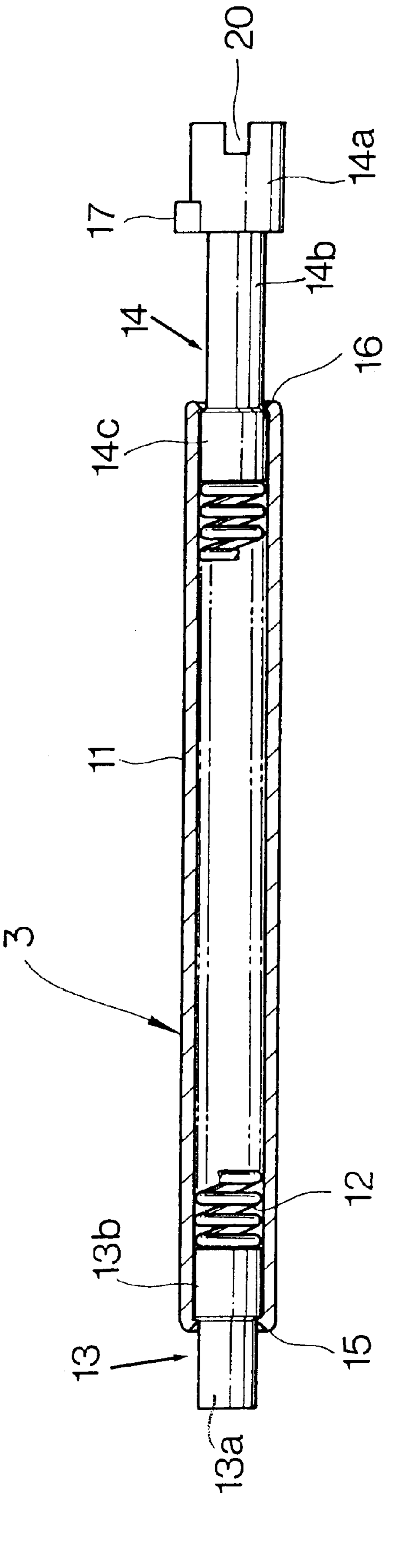
FIG. 3 is a sectional view of a connecting pin.

As shown in FIG. 3, the connecting pin 3 has a similar construction as an ordinary spring-loaded pin, and comprises a pipe 11, a spring 12 inserted in the pipe, front and rear end pins 13 and 14 slidably inserted in the pipe and pressed against opposite ends of the spring 12.

The front end pin 13 comprises a small diameter portion 13*a* and a large diameter portion 13*b* and is prevented from falling out from the pipe by an inner flange 15 of the pipe 11. The rear end pin 14 comprises a rear end large diameter manipulating portion 14*a*, a small diameter portion 14*b* at the middle thereof and a front end large diameter portion 14*c*, and is held by a flange 16.

The manipulating portion 14*a* has an engaging lug 17 projecting in a radial direction, and an engaging groove 20 is formed on the end surface so that a tip of a screwdriver 18 (FIG. 1) may be engaged therewith.

Figure 4A:
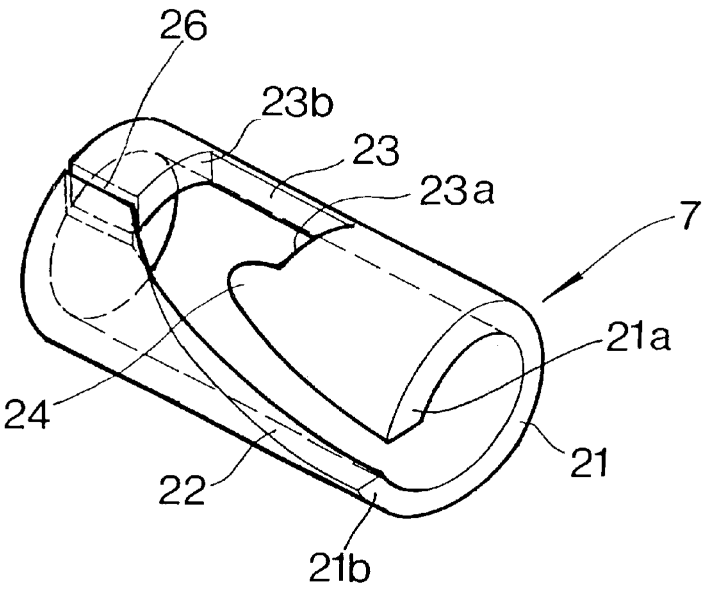
FIG. 4*a* is a perspective view of a pin locking cylinder.

As shown in FIG. 4*a*, the pin locking cylinder 7 has an inclined guide surface 21 at the outer end, helical guide groove 22 extending in the axial direction, and an engaging hole 23 formed at the inner end of the guide groove 22 in the circumferential direction and communicating with the guide groove.

Figure 4B:
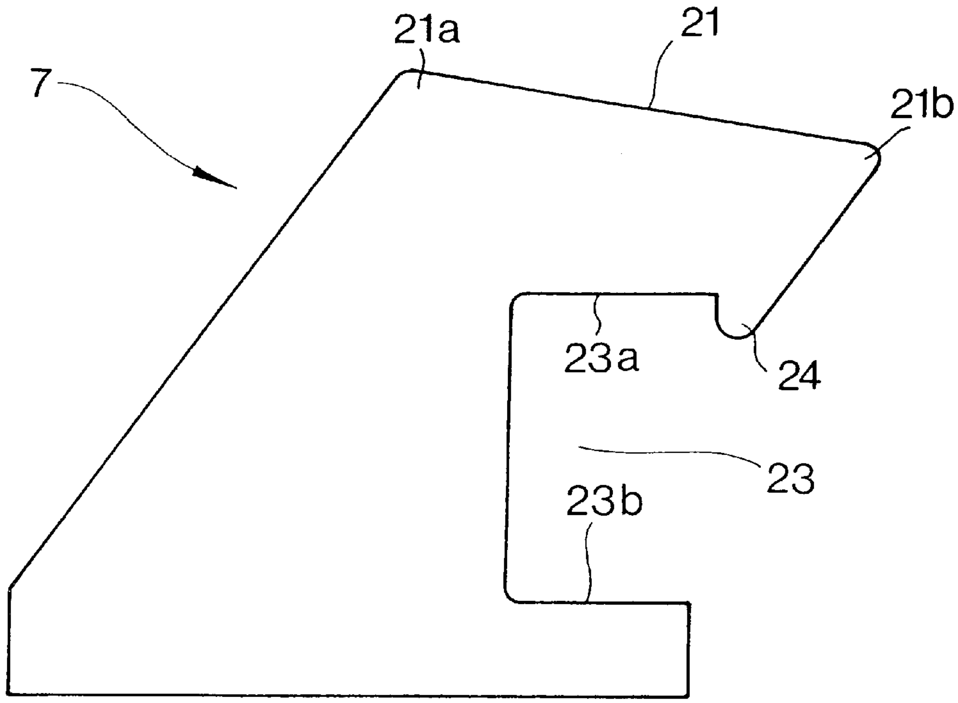
FIG. 4*b* is a development of the pin locking cylinder.

The inclined guide surface 21 is inclined in the axial direction so as to descend toward the inner side of the cylinder 7 as it extends from one end 21*a* to the other end 21*b* as shown in FIG. 4*b*.

The engaging hole 23 has a circumferential inner wall 23*a* at the outer side and an opposite circumferential inner wall 23*b*. A stopper lug 24 is formed between the inner wall 23*a* and the guide groove 22. The circumferential lengths of the inner wall 23*a* and the opposite inner wall 23*b* are adapted to be sufficient for allowing the engaging lug 17 to be engaged.

The pin locking cylinder 7 of the aforementioned construction can be produced by directly machining a metal pipe, or by cutting a metal plate into a shape shown by the development of FIG. 4*b*, and forming it into a cylindrical shape. In the embodiment shown in the drawings, the cylinder is formed from the metal plate so that joining surfaces 26 confront each other.

The pin locking cylinder 7 is inserted in the hole 8 of the link 2, and fixed therein by way of welding, brazing, staking, or press fitting.

In order to connect one link 2 to another, the projection 6 of one of the links is engaged in the recess 5 of the other link, the connecting pin 3 is inserted through the pin locking cylinder 7, and the front end pin 13 is inserted in the blind hole 9. At that time, the manipulating portion 14*a* of the rear end pin 14 projects outward from the pin locking cylinder 7. The tip of the screwdriver 18 is then engaged with the groove 20 of the manipulating portion 14*a*, and when the manipulating portion is pushed inward against the urging of the spring 12, the lug 17 abuts against the inclined guide surface 21. As is well known, the screwdriver for watches has a body 18*a* and a head (not shown) which are rotated relative of each other. The middle portion of the body is held with the thumb and middle finger, and the head is pushed with the index finger. Thus, when the thumb and the middle finger are released from the body 18*a* and the head is pushed under such a state, the lug 17 is urged to slide in the circumferential direction along the inclination of the guide surface 21. The body 18*a* is accordingly rotated together with the pin 14, thereby to allow the lug 17 to slide so that the lug is automatically guided toward the guide groove 22 and enters therein. With a further push, the lug 17 enters the engaging hole 23 until it abuts against the inner wall 23*b* so as to be stopped. During the operation, since the guide groove 22 is helical, the lug 17 is automatically carried into the engaging hole 23. Thereafter, the screwdriver is released, so that the spring 12 urges the manipulating portion 14*a* to retract, and the lug 17 abuts on the inner wall 23*a* and stops. In such a state, the lug 17 is prevented by the stopper lug 24 from moving in the circumferential direction, that is, toward the guide groove 22, so as to be prevented from slipping.

Figure 2:
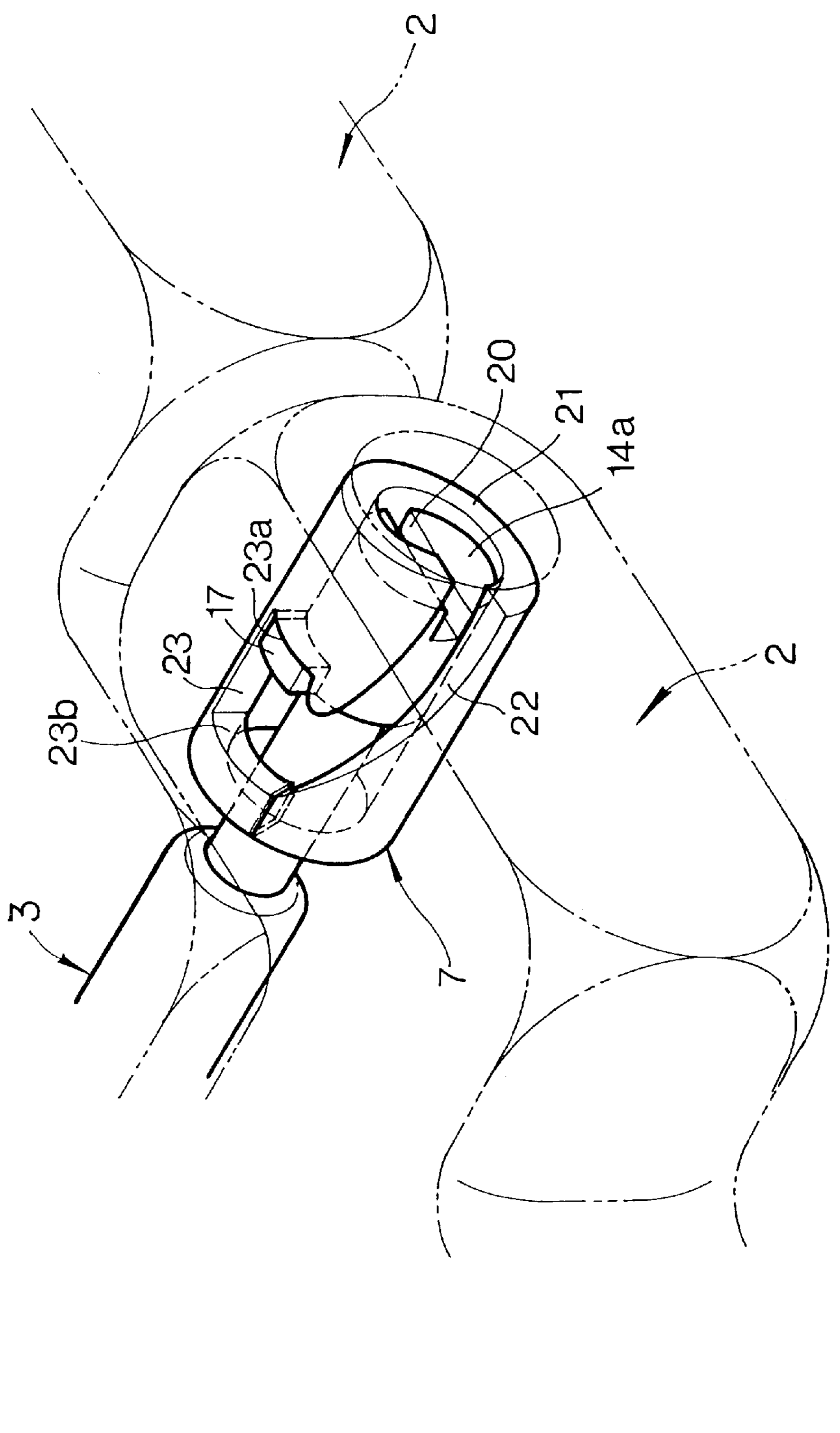
FIG. 2 is a perspective view of a main portion of a connected band.

In such a state, as shown in FIG. 2, the outer end surface of the manipulating portion 14*a* is adapted to be positioned substantially flush with the outer end surface of the pin locking cylinder 7.

In order to disengage the link, an ordinary screwdriver is used to push the manipulating portion 14*a* so that the lug 17 is released from the lug 24. The manipulating portion is rotated in the counterclockwise direction in FIG. 2, and the screwdriver is released. Hence the manipulating portion 14*a* is urged by the spring 12, thereby rendering the lug 17 to move outwardly along the guide groove 22 so as to be released. The manipulating portion 14*a* projects out of the link 2 so that, by pinching the manipulating portion with the fingers, the pin 3 can be easily taken out and the link is disengaged.

Figure 5:
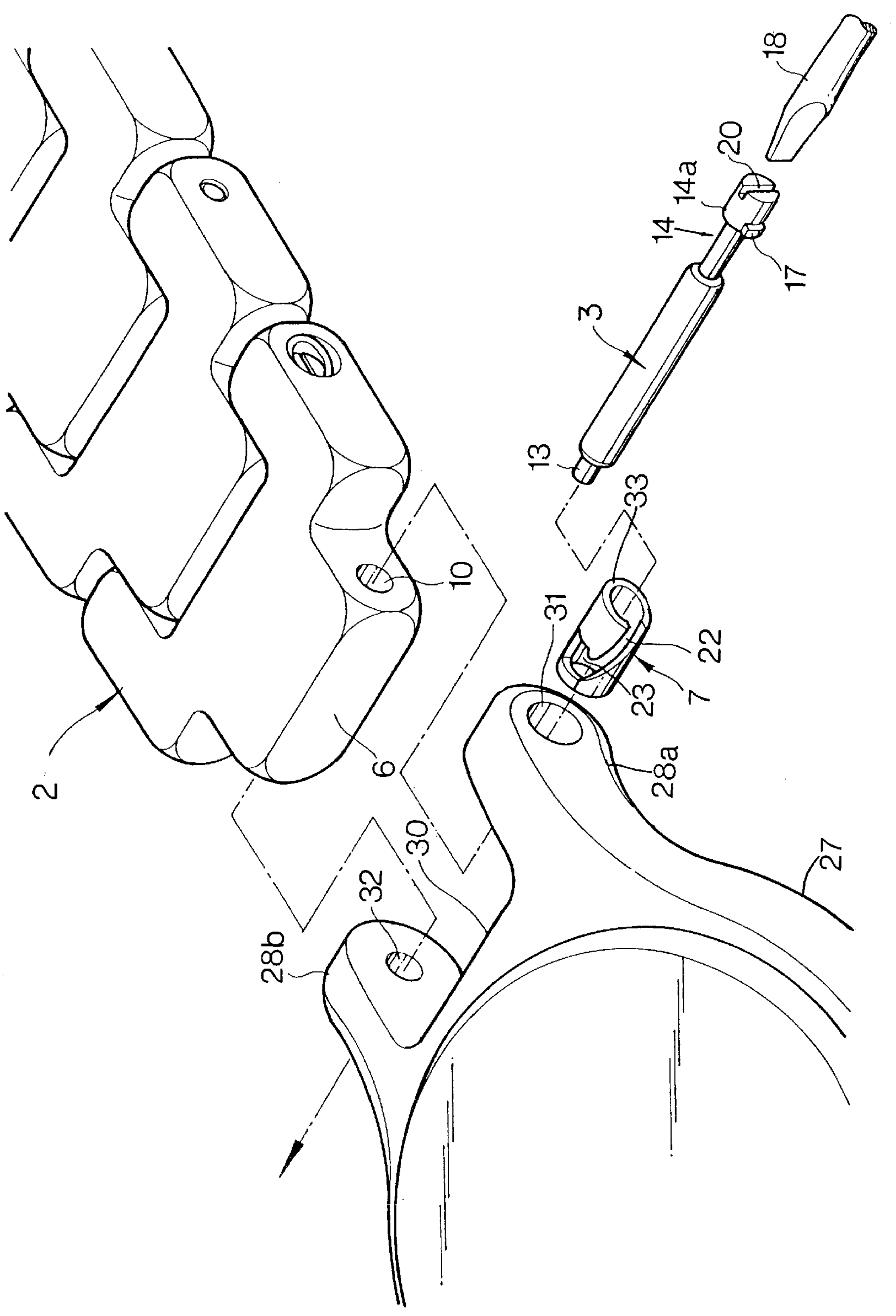
FIG. 5 is an exploded perspective view of a second embodiment of the present invention.
Figure 6:
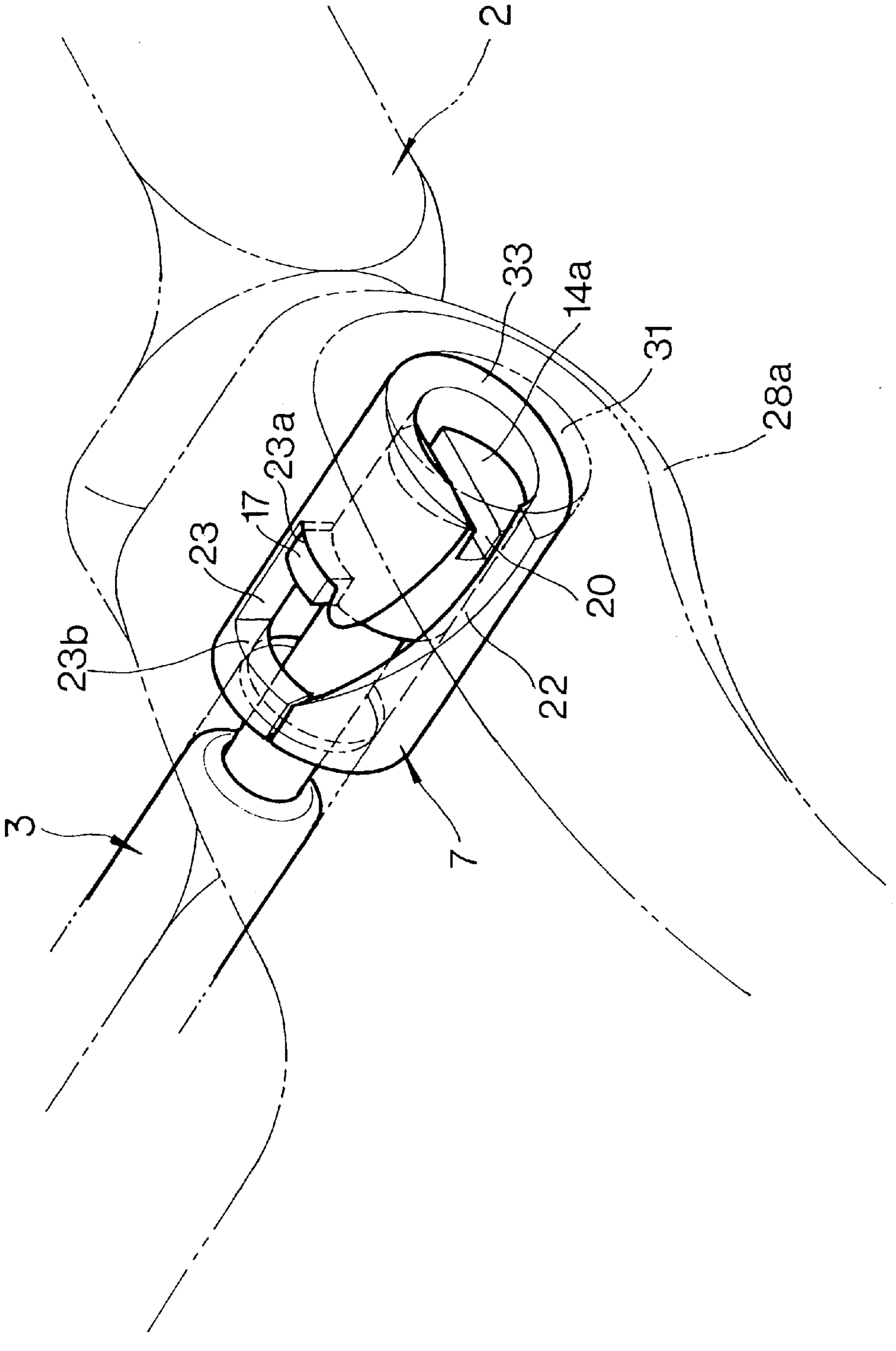
FIG. 6 is a perspective view of a main portion of a connected band of the second embodiment.

FIG. 5 shows the perspective view of the second embodiment of the present invention. The present embodiment is adapted to a structure for connecting the band 1 to a watchcase 27. The parts of the structure which are the same as those in the first embodiment are identified with the same references so that the descriptions thereof are omitted.

The watchcase 27 has a pair of connecting legs 28*a* and 28*b*, and a recess 30 with which the projection 6 of the link 2 is to be engaged. A hole 31 is formed in the connecting leg 28*a* and a blind hole 32 is formed in the connecting leg 28*b*. The blind hole 32 may be a hole.

An inclined guide surface 33 of the pin locking cylinder 7 is different from that of the first embodiment.

Figure 7A:
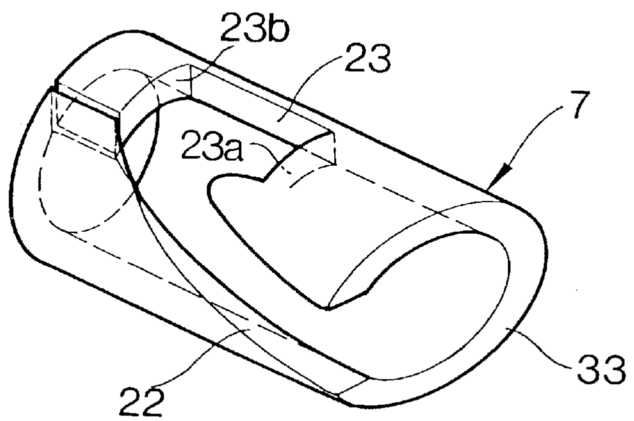
FIG. 7*a* is a perspective view of a pin locking cylinder.
Figure 7B:
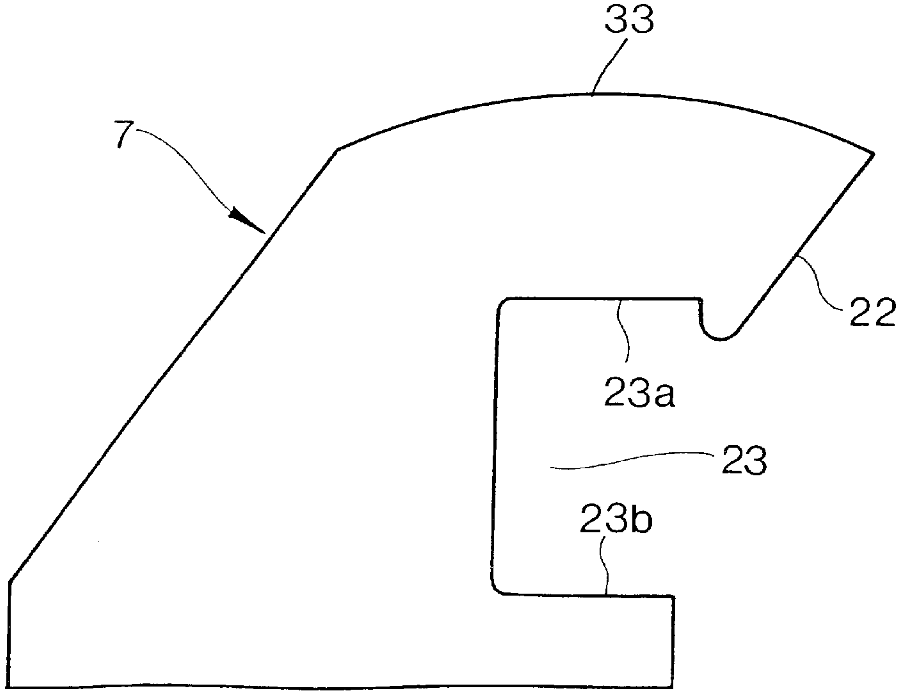
FIG. 7*b* is a development of the pin locking cylinder.

More particularly, as shown in FIGS. 7*a* and 7*b*, the center portion of the inclined guide surface 33 is the highest position and the surface gradually declines along the either side toward the guide groove 22. The other construction is the same as that of the first embodiment.

In the thus constructed structure, the connecting pin 3 is inserted in each of the holes of the case and the link, and the manipulating portion 14*a* is pushed with the screwdriver. The lug 17 accordingly abuts against the guide surface 33 and slides in one of the right and left directions so as to be guided into the guide groove 22. The operation thereafter is the same as in the first embodiment.

Figure 8:
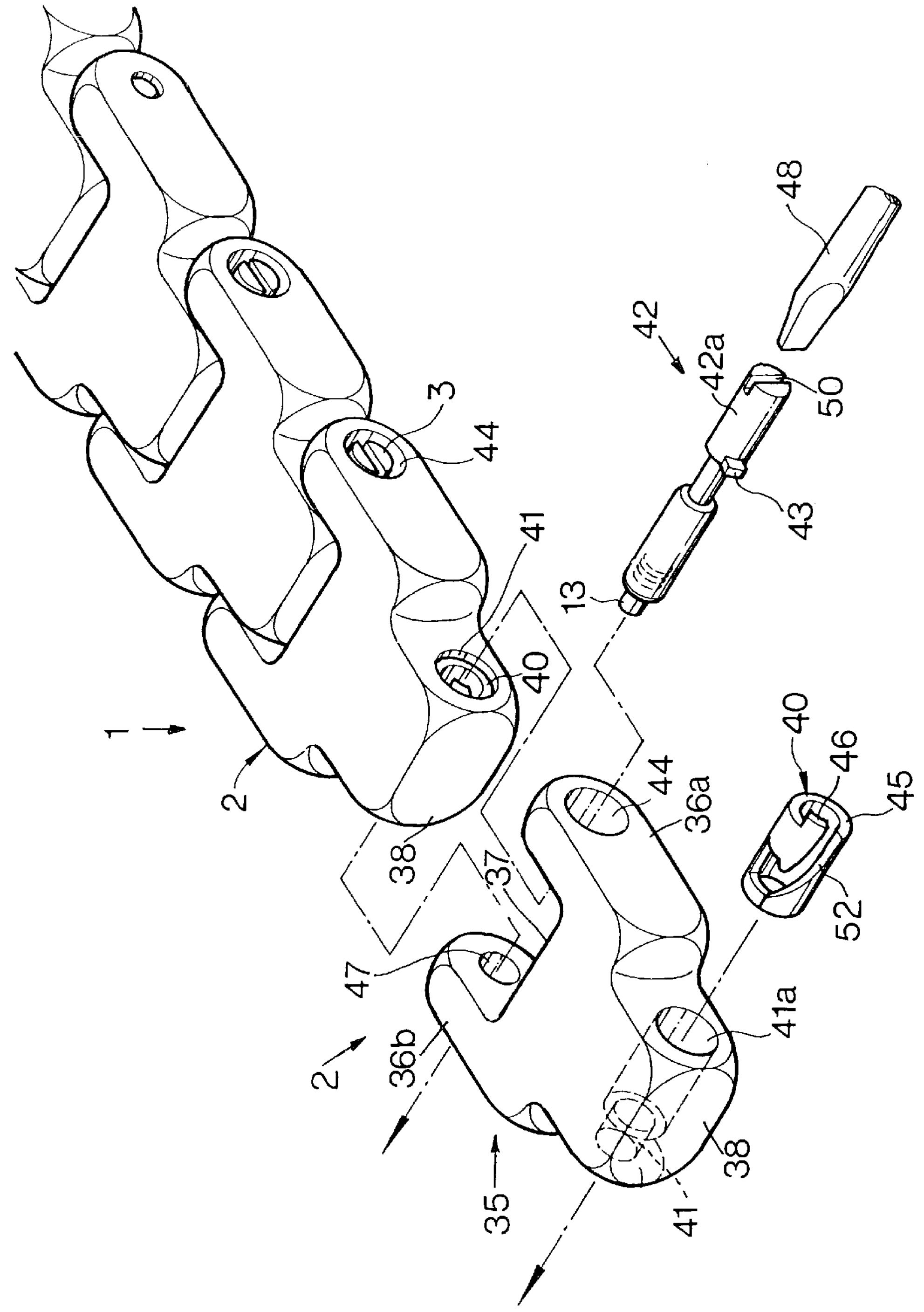
FIG. 8 is an exploded perspective view of a third embodiment of the present invention.
Figure 9:
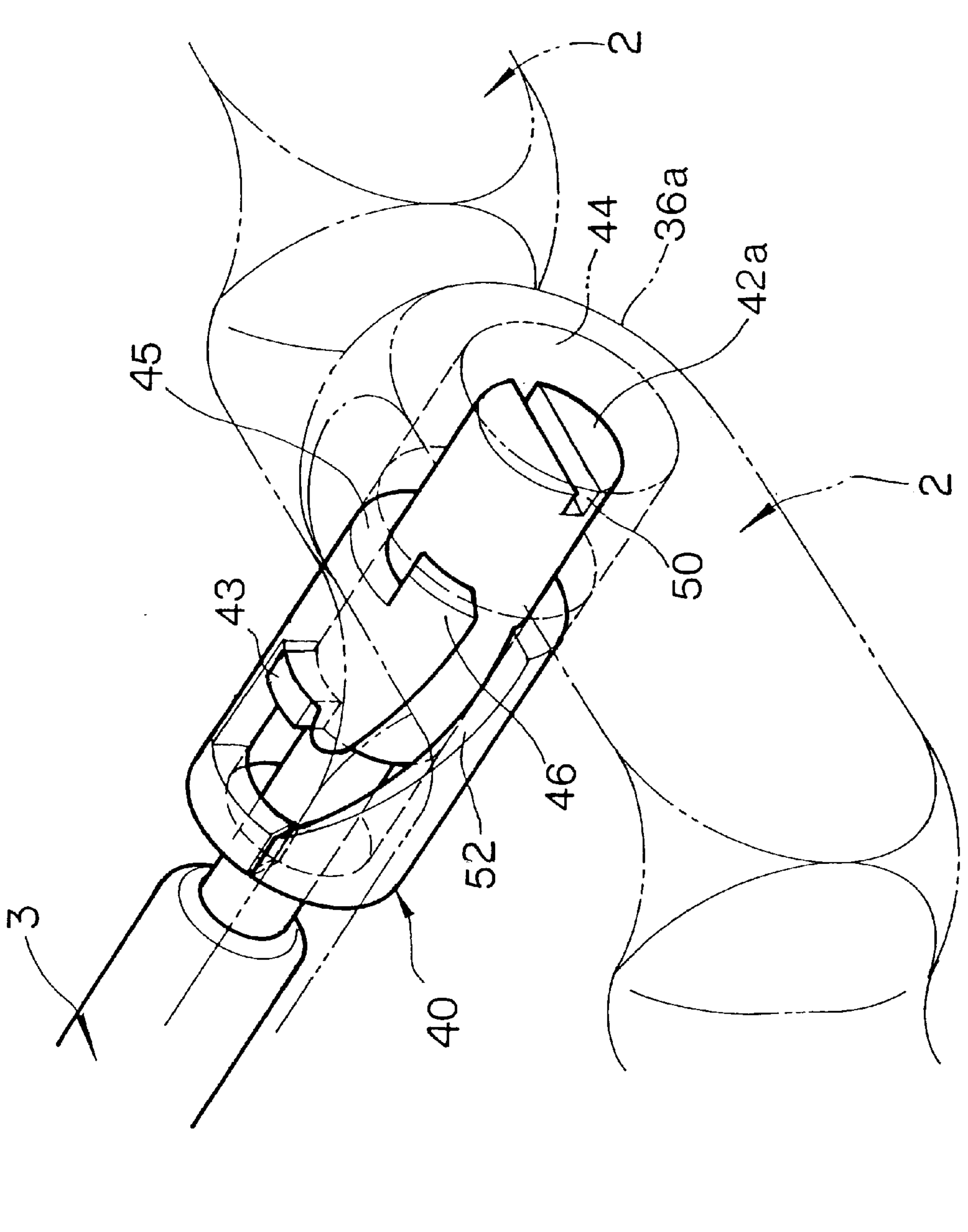
FIG. 9 is a perspective view of a main portion of a connected band of the third embodiment.

FIG. 8 shows the third embodiment of the present invention which is appropriate for a band with a small width.

A link 35 comprises a pair of connecting legs 36*a*, 36*b*, recess 37, and a projection 38. Each of the connecting legs 36*a* and 36*b* has a small width so that it is not appropriate to provide a pin locking cylinder 40 therein. Hence, the pin locking cylinder 40 is adapted to be fixed in the projection 38. Accordingly, a recessed hole 41 having a large diameter portion 41*a* is provided in the projection 38. Alternatively, the hole 41 may be bored at the diameter of the large diameter portion 41*a* through the projection. A large diameter hole 44 is formed in the connecting leg 36*a* so as to allow a lug 43 formed on a manipulating portion 42*a* of a pin 42 to pass there-through. Consequently, the manipulating portion 42*a* of the pin 42 is elongated so that the lug 43 may reach the pin locking cylinder 40. In addition, the large diameter hole 44 may have a diameter slightly larger than the manipulating portion 42*a* of the pin 42 (will be later described), and formed into a shape of a keyhole so that the lug 43 may pass there-through.

Figure 10A:
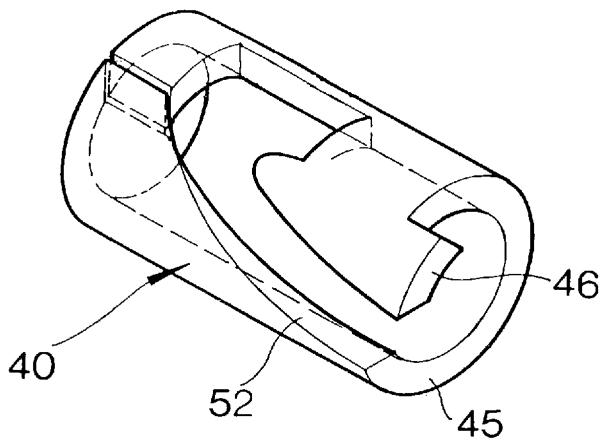
FIG. 10*a* is a perspective view of a pin locking cylinder.
Figure 10B:
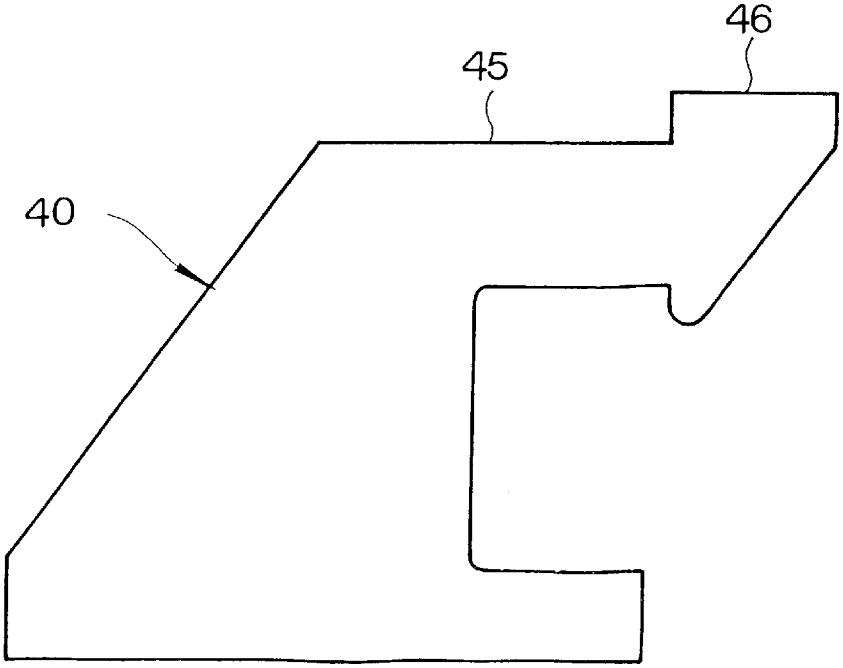
FIG. 10*b* is a development of the pin locking cylinder.

On the other hand, as shown in FIG. 10*b*, an end surface 45 of the pin locking cylinder 40 is linear and perpendicular to the axis, and a guide lug 46 is formed at an end of the end surface 45. The other parts are the same as in the first embodiment and identified by the same references.

Thus, in the present embodiment, after the pin 42 is inserted in the holes 44 and 41 and the blind hole 47, an ordinary screwdriver 48 is engaged with a groove 50 formed on the manipulating portion 42*a*. The manipulating portion is rotated in the clockwise direction in FIGS. 8 and 10, and stops when the lug 43 abuts against the lug 46. The screwdriver is then pushed, thereby rendering the lug 43 to enter the guide groove 52 so that the pin is locked as in the first embodiment. The blind hole 47 of the connecting leg 36*b* may be a hole.

When removing the link, the operation of the first embodiment is carried out.

Figure 11:
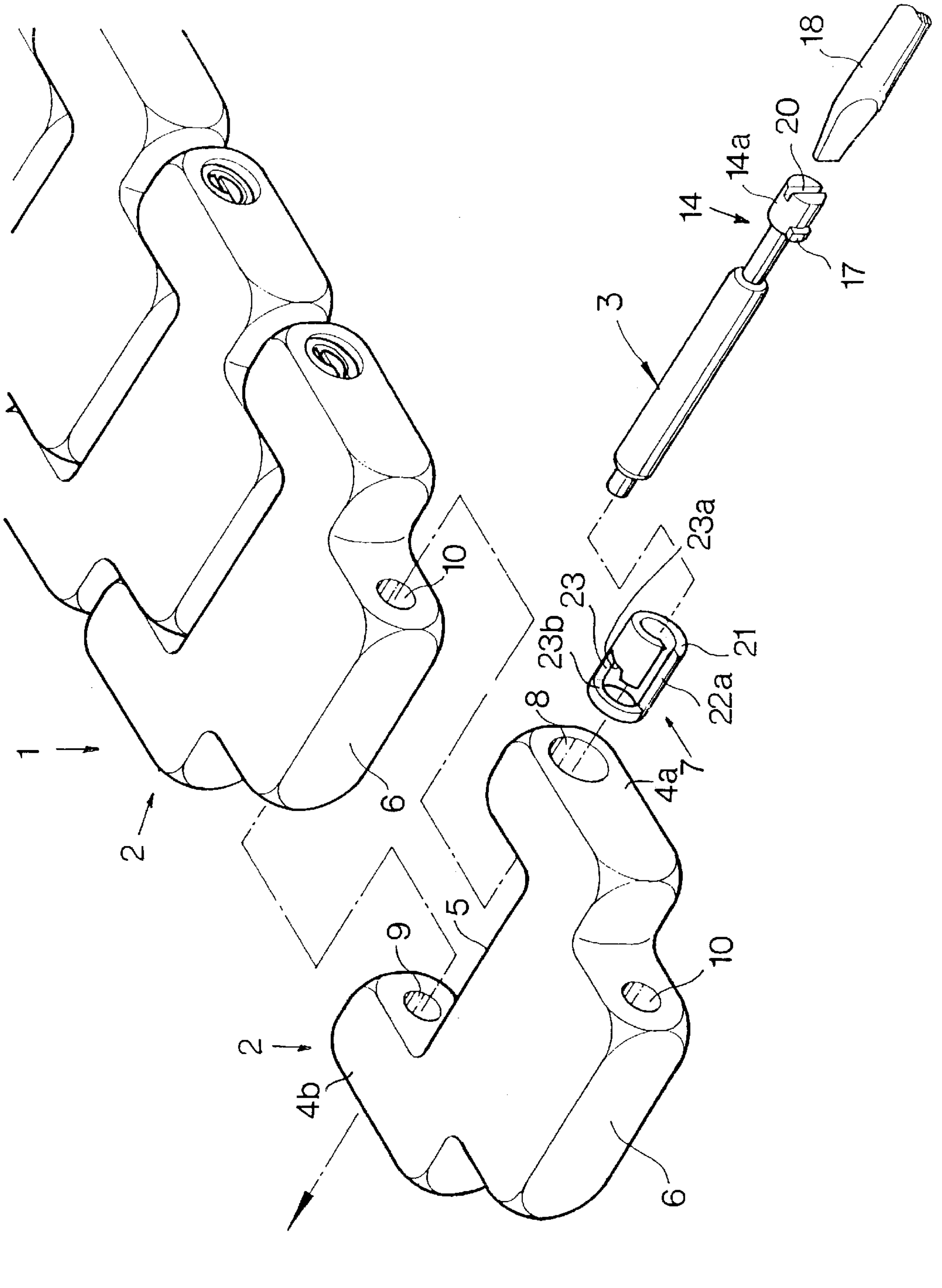
FIG. 11 is an exploded perspective view of a fourth embodiment of the present invention.

FIG. 11 shows the fourth embodiment of the present invention. The present embodiment is characterized in that the outer end of the pin locking cylinder 7 forms the inclined guide surface 21, and that a guide groove 22*a* of the pin locking cylinder 7 forms a linear line which is parallel to the axis instead of being helical. Other parts are the same as in the first embodiment and are identified with the same references.

In the present embodiment, since the guide groove 22*a* is linear, the lug 17 is not automatically inserted in the engaging hole 23. Hence, the pin 3 must be pushed with the screwdriver 18 and rotated in the clockwise direction to urge the lug 17 to enter the hole 23. The other operations are the same as in the first embodiment.

PROBABILITY OF INDUSTRIAL EXPLOITATION

In accordance with the present invention, the lug of the connecting pin can be easily engaged with the engaging hole formed in the pin locking cylinder without the user employing a special tool so that the connecting and releasing operation of the links can be remarkably easily performed, as well as resulting in a stable engagement. In addition, the lug of the connecting pin can be easily engaged with the guide groove of the pin locking cylinder.

What is claimed is:

1. A personal adornment band comprising a plurality of links each having a pair of legs, a recess formed between the legs, and a projection formed on the other side of the recess, the projection of each link being inserted in the recess of an adjacent link, and a connecting pin being inserted into holes formed in the connecting legs and the projection of the links for connecting the links, wherein at least each of some of the links has a pin locking cylinder fixed in one of the holes;

the connecting pin has a manipulating portion slidable in the axial direction thereof, a radially projecting engaging lug formed on the manipulating portion, and a spring for outwardly urging the manipulating portion;

the pin locking cylinder has a guide surface formed at the connecting pin inserting end, a guide groove axially extending from the guide surface, an engaging hole formed at the inner end of the guide groove in the circumferential direction, and a stopper lug formed between an outer inner wall of the engaging hole and the guide groove; and the manipulating portion is pushed by a screwdriver thereby causing the engaging lug to be inserted from the guide surface of the pin locking cylinder into the guide groove and the engaging hole, and to be engaged with the stopper lug of the engaging hole.

2. The personal adornment band according to claim 1 wherein the guide groove is helical, thereby introducing the engaging lug into the engaging hole.

3. The personal adornment band according to claim 1 wherein the guide surface has an inclination declining axially inward from one end to the other end.

4. The personal adornment band according to claim 1 wherein the guide surface has an inclination declining from a center portion thereof toward opposite ends.

5. The personal adornment band according to claim 1 wherein a lug is formed at an end of the guide surface for stopping the engaging lug.

6. A watch comprising a plurality of links each having a pair of legs, a recess formed between the legs, and a projection formed on the other side of the recess, the projection of each link being inserted in the recess of an adjacent link, and a connecting pin being inserted into holes formed in a pair of connecting legs of a watchcase and the projection of an end link of a band, wherein the watchcase has a pin locking cylinder fixed in a hole of the connecting legs;

the connecting pin has a manipulating portion slidable in the axial direction thereof, a radially projecting engaging lug formed on the manipulating portion, and a spring for outwardly urging the manipulating portion;

the pin locking cylinder has a guide surface formed at the connecting pin inserting end, a guide groove axially extending from the guide surface, an engaging hole formed at the inner end of the guide groove in the circumferential. direction, and a stopper lug formed between an outer inner wall of the engaging hole and the guide groove; and the manipulating portion is pushed by a screwdriver thereby causing the engaging lug to be inserted from the guide surface of the pin locking cylinder into the guide groove and the engaging hole, and to be engaged with the stopper lug of the engaging hole.

7. The watch according to claim 6 wherein the guide groove is helical, thereby introducing the engaging lug into the engaging hole.

8. The watch according to claim 6 wherein the guide surface has an inclination declining axially inward from one end to the other end.

9. The watch according to claim 6 wherein the guide surface has an inclination declining from a center portion thereof toward both ends.

10. The watch according to claim 6 wherein a lug is formed at an end of the guide surface for stopping the engaging lug.

* * * * *

UNITED STATES PATENT AND TRADEMARK OFFICE

CERTIFICATE OF CORRECTION

PATENT NO. : 6,098,394

DATED : August 8, 2000

INVENTOR(S) : NORIO HASHIMOTO, et al.

It is certified that error appears in the above-indentified patent and that said Letters Patent is hereby corrected as shown below:

On Title page, in the section entitled "Assignee", replace "Electronics" with -- Watch --.

Signed and Sealed this

Twenty-second Day of May, 2001

Attest:

Nicholas P. Godici

NICHOLAS P. GODICI

Attesting Officer

*Acting Director of the United States Patent and Trademark Office*